United States Patent [19]
Schultz et al.

[11] Patent Number: 4,768,131
[45] Date of Patent: Aug. 30, 1988

[54] PULL-OUT FRAME WITH A GUIDE RAIL FOR ELECTRIC SWITCHGEAR

[75] Inventors: Rosemarie Schultz; Fred Sinnig, both of Berlin, Fed. Rep. of Germany

[73] Assignee: Siemens Aktiengesellschaft, Berlin and Munich, Fed. Rep. of Germany

[21] Appl. No.: 937,966

[22] Filed: Dec. 4, 1986

[30] Foreign Application Priority Data

Dec. 13, 1985 [DE] Fed. Rep. of Germany ....... 3544664

[51] Int. Cl.⁴ .......................................... H02B 11/12
[52] U.S. Cl. ............................... 361/338; 200/50 AA
[58] Field of Search ................. 200/50 AA; 361/338, 361/339, 340, 342, 343, 357, 390, 391

[56] References Cited

U.S. PATENT DOCUMENTS

| | | | |
|---|---|---|---|
| 2,121,610 | 6/1938 | Rugg et al. | 361/339 |
| 2,128,149 | 8/1938 | Linde | 361/339 |
| 2,264,755 | 12/1941 | Johnson et al. | 200/50 AA |
| 2,295,405 | 9/1942 | Johnson et al. | 361/338 |
| 2,769,940 | 11/1956 | Pettit | 361/357 |
| 3,483,338 | 12/1969 | Bould et al. | 200/50 |
| 3,663,773 | 5/1972 | Powell | 361/339 |

FOREIGN PATENT DOCUMENTS

| | | | |
|---|---|---|---|
| 0524094 | 4/1956 | Canada | 200/50 AA |
| 1291398 | 3/1969 | Fed. Rep. of Germany . | |
| 1051157 | 1/1954 | France . | |
| 1162903 | 9/1958 | France . | |

Primary Examiner—G. P. Tolin
Assistant Examiner—Gregory D. Thompson
Attorney, Agent, or Firm—Kenyon & Kenyon

[57] ABSTRACT

A pull-out frame for electric switchgear is provided in the vicinity of its side walls with bolts which serve as pivots or stops of guide rails which can be retrofitted. The guide rails are provided with a keyhole-like opening, the narrower part of which correspond to the diameter of a bolt and the wider part of which correspond to the diameter of the collar of the bolt. The connection of the guide rails to the side walls can be made by shifting the guide rails in the direction of the force of gravity and can be released in the reverse direction. For securing each guide rail in its upright rest position, a latch which extends beyond one leg of the guide rail in fork-fashion is provided which can likewise be retrofitted at the corresponding side wall.

9 Claims, 2 Drawing Sheets

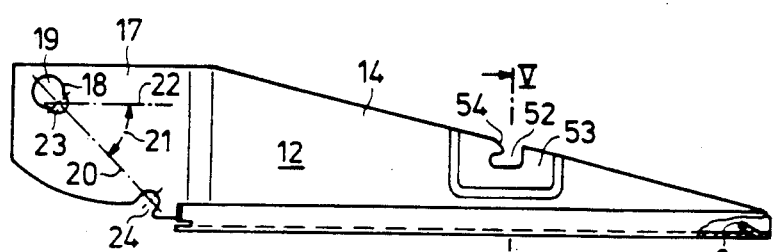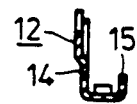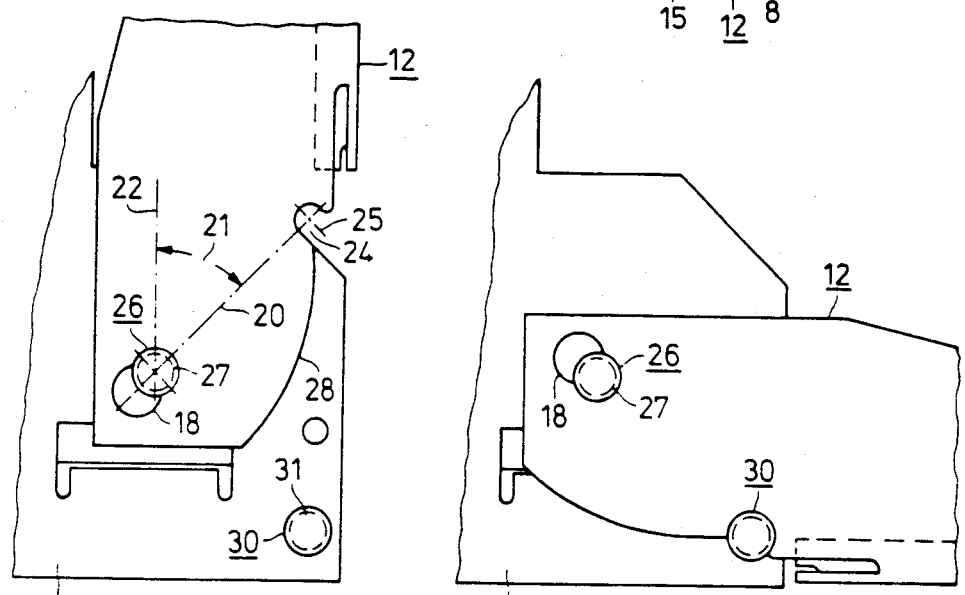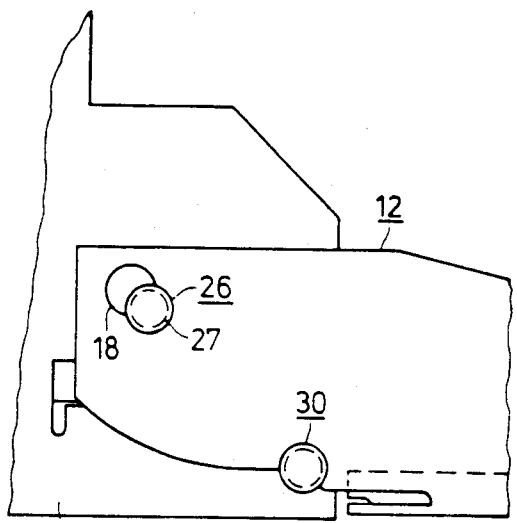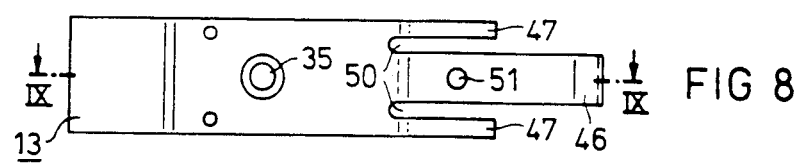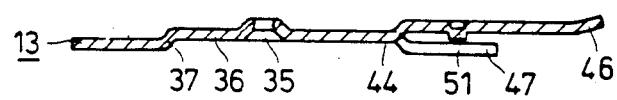

PULL-OUT FRAME WITH A GUIDE RAIL FOR ELECTRIC SWITCHGEAR

BACKGROUND OF THE INVENTION

The present invention relates to a pull-out frame for electric switchgear having a skeleton frame and at least one guide rail for the switchgear which is arranged adjustably on the frame for motion between a rest position and an operating position.

For electric switching installations, a type of design is known in which the switching apparatus can be pulled out while the main circuits are interrupted at the same time so that maintenance work, for instance, can be performed or the switchgear can be tested. In connection therewith it is known, to facilitate the complete removal of switchgear from the switching installation, to provide guide rails which can be folded out for use from the switch cell. Such guide rails can be arranged, for instance, hanging down vertically if not in use (U.S. Pat. No. 2,264,755), or they can be disposed upwardly into a vertical position (U.S. Pat. No. 3,663,773). However, a considerable amount of components are required to equip the switching installations or the pull-out frames contained therein, basically with guide rails of the type mentioned. In many cases such guide rails are not needed because, for instance, for servicing a large switching installation, special lifting devices or similar aids are available which can take over the function of the guide rails.

SUMMARY OF THE INVENTION

It is an object of the invention to provide guide rails of the type mentioned as accessories which can be installed, if necessary, by the user himself in a simple manner.

The above and other objects of the invention are achieved by an apparatus for receiving a drawout switchgear including a frame and two guide rails for supporting the switchgear in a drawn-out position thereof, wherein the guide rails are pivotably fastened to the frame by cooperating connecting means disposed on the guide rails and the frame and stop means are provided limiting pivotable movement of each guide rail from a vertical resting position to a horizontal operating position whereby in the horizontal operating position the switchgear can be moved into its drawnout position, the connecting means being effective to fasten the guide rails under the influence of gravity to the frame and the connecting means being disengageable by lifting the guide rails in a direction opposite to the force of gravity.

To this end, the invention starts out with a pull-out frame for electric switchgear with a rack and at least one guide rail arranged thereon movably between a rest position and an operating position for the switchgear, and achieves the started object by the provision that the guide rail and the rack of the pull-out frame are equipped with connecting elements cooperating in a form-locking manner, where the locking connection can be made by a shift of the guide rail in the direction of the force of gravity and can be released by a shift against the force of gravity. In this manner, the pull-out frames can, first, be made more economically without guide rails where, however, retrofitting with guide rails can be carried out without any machining effort and with only a few manual operations.

The connecting elements with form-locking action can at the same time be designed as a pivot of the guide rail, and stop elements for securing the guide rail in its operating position can be provided. With this arrangement, the connecting elements and the stop elements can be realized as simple rugged parts. It has been found in particular to be an advantage to design the connecting elements as cylindrical bolts provided with a collar and a keyhole-like opening, where the diameter of the bolt is designed in accordance with the narrow part of the opening the diameter of the collar in accordance with the wide part of the opening.

Also the stop elements may comprise a bolt provided with a collar, where a recess intended for receiving the bolt can be provided as the counterpiece. In this manner it is achieved that in the transition of a guide rail into its operating position, an additional form-locking connection is brought about which increases the load-carrying capacity of the guide rail.

The mentioned bolts can be arranged at the rack of the pull-out frame while the keyhole-like opening as well as the recess are arranged at the guide rail. Both bolts can be identical.

It is likewise found to be advantageous for simple handling when setting the guide rail to the pull-out frame and for the operation of the connecting elements provided for this purpose as pivot bearings, to arrange the symmetry axis of the keyhole-like opening at an angle relative to the vertical if the guide rail is in the vertical rest position, and to provide the recess on the extension of the symmetry axis at the edge of the part provided with the opening, the symmetry axis of the recess being at right angles to the symmetry axis of the keyhole-like opening. The guide rail is secured thereby against a shift in the vicinity of the connecting elements when the operating position is reached, because the recess and the further bolt form an additional form-locking connection. In this connection it is advisable to provide the edge cooperating with the further bolt, of the part provided with the recess as a transition to the recess with a rounded area. In this manner, the running of the recess on the further bolt is facilitated in the case that with the preceding tilting, a certain amount of shift of the guide rails in the vicinity of the connecting element should have occurred. Otherwise, it has been found that it contributes to trouble-free operation if the symmetry axis of the keyhole-like opening is arranged included by about 45° in the direction of the operating position of the guide rail relative to the vertical.

It is basically possible to design the connecting elements in such a manner that they not only form a form-locking connection and act as a pivot but also cause locking of the guide rails in the vertical rest position. Since, however, such an operation is not easy to achieve by the user, it is advisable, on the other hand, to make the guide rails in their rest position pivoted about a joint by a latch which is arranged to engage a guide hole and can be locked there. Since the existence of such a latch and its operation will be understood by the user immediately, the operation presents no difficulties. The guiding opening for such a latch can be formed in a simple manner by one of two parallel cutouts of the side wall of the rack, the part of the wall located between the cutouts being pushed out as a bracket from the plane of the side wall. A restoring spring for such a latch can be accomodated in a particularly space-saving manner in a window-like opening of the side wall of the rack. As the latch pin, a boss or post pushed out of the material of the latch is sufficient if provision is made by a fork-like design of the latch at its end facing the guide rail, that the guide rail and the latch can be brought into mutual engagement with little play.

BRIEF DESCRIPTION OF THE DRAWINGS

The invention will be explained in greater detail in the following detailed description with reference to the drawing figures, in which:

FIGS. 3 and 4 show a guide rail as an individual part in two mutually perpendicular views, FIG. 3 being a side view and FIG. 4 being a top view;

FIG. 5 shows a cross section along the line V—V in FIG. 3;

FIGS. 6 and 7 show as a detail the cooperation of a connecting element and the stop elements at a guide rail and the skeleton of the pull-out frame. In FIG. 6 the guide rail is in its vertical rest position, while it is shown in FIG. 7 as tilted into its horizontal operating position;

FIGS. 8 and 9 show a latch for securing a guide rail in its vertical rest position in, respectively a top view and in a cross section taken along line IX—IX.

DETAILED DESCRIPTION

Figure 1:
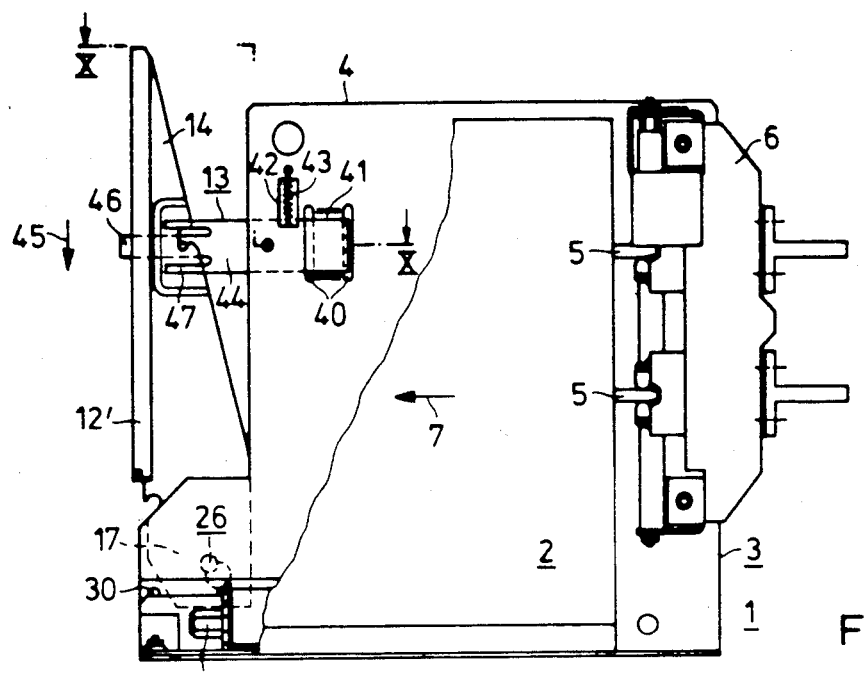
FIGS. 1 and 2 show a pull-out frame for a low voltage circuit breaker in, respectively a cross-sectional side view and a simplified top view.
Figure 2:
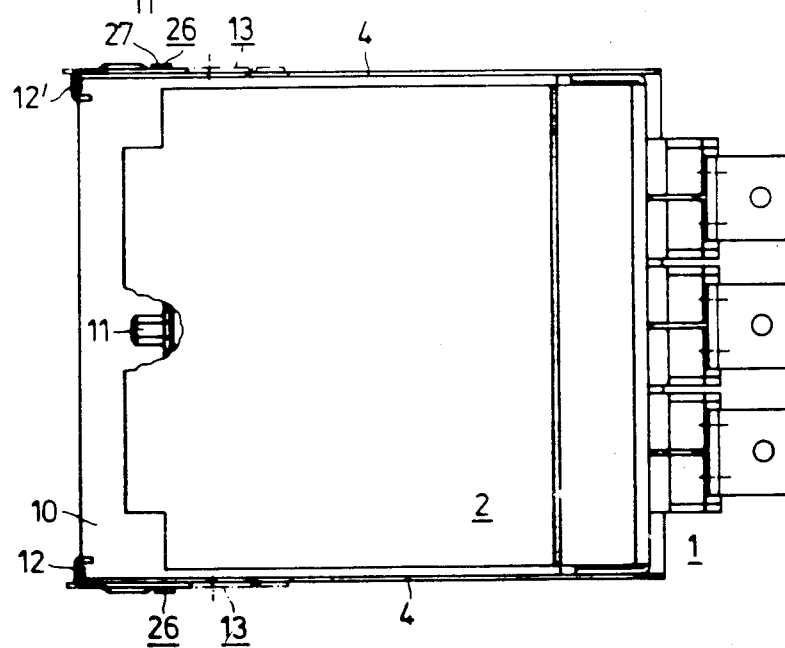

The pull-out frame 1 shown in FIGS. 1 and 2 is intended for receiving a low-voltage circuit breaker. The pull-out frame in turn is provided in a manner known per se for installation in a switching installation or a control cabinet. A circuit breaker 2 is indicated schematically; a presentation of details of the circuit breaker can be dispensed with since the guide rail arrangement yet to be described can be used independently of the design of the circuit breaker. It is merely necessary that a circuit breaker installed in the frame has elements cooperating with the guide rail arrangement such as rollers, sliding elements or runners.

The pull-out frame 1 has a skeleton 3 which can be composed of sheet metal parts in the manner known per se. The detailed design of these parts as well as their connection is likewise of secondary importance for the guide rail arrangement to be described, herein so that a more detailed description of the design of the skeleton 3 can be dispensed with. It should be mentioned, however, that the skeleton 3 has two side walls 4, the one in the front being removed in FIG. 1 so as to make visible the parts located behind. The circuit breaker 2 is provided with connecting pieces 5 in a manner known per se which are arranged in two parallel rows on top of each other and are, in the position of the circuit breaker shown in engagement with the break-contact arrangement 6. The break contact arrangement 6 can contain break contact blocks according to U.S. Pat. No. 4,486,636, for instance. If the circuit breaker 2 is to be removed from the pull-out frame 1 after its connecting pieces 5 are separated from the break contact arrangement 6, this is done by shifting the circuit breaker 2 in the direction of the arrow 7. This is close initially within the pull-out frame, for instance, directly by sliding or rolling elements of the circuit breaker 2 provided for this purpose, on a bottom sheet 10 of the skeleton 3. For this purpose, a threaded spindle can be used, the front end of which is provided with a hexagonal head 11 for engagement by a tool as shown in FIGS. 1 and 2. For the further movement, guide rails 12 and 12' of mirror-symmetrical design are provided which are attached to the side walls 4 of the skeleton 3 in an articulated manner. In the rest position shown, the guide rails 12 are in a vertical position and are held therein by a latch 13.

Details of the guide rail 12 will be explained in the following, making reference to FIGS. 3, 4 and 5. As is shown particularly in FIG. 5, the guide rail 12 has the shape of a U, wherein the legs 14 and 15 are provided for guiding the the rollers, sliding elements or runners of the circuit breaker 2 and the bottom area 16 located between these legs forms the actual sliding or rolling surface for these elements. A stop 8 bent out at the outer end of the bottom surface 16 limits the travel of the circuit breaker 2. The leg 14 of the guide rail 12 has, for instance, the shape of an acute-angle triangle which is followed by an approximately rectangular end piece 17. This end piece 17 of the guide rail 12 is offset approximately where the U-shaped region of the guide rail ends, relative to the plane of the triangular section of the leg 14. This offset can be made in accordance with the thickness of the side walls 4 of the skeleton 3 in FIGS. 1 and 2. The rectangular end piece 17 of the leg 14 contains a through opening 18 which has the shape of a keyhole and the axis of symmetry 20 of which is arranged at an angle 21 of about 45° relative to the lengthwise extent of the guide rail 12. This longitudinal extent is designated by a line 22 which coincides with the vertical position of the guide rail in FIGS. 1, 2 and 6. A narrower part 23 of the opening 18, acting as a bearing opening, faces a recess 24 which is located at the edge of the end part 17 near the end of the U-shaped part of the guide rail 12. The symmetry axis of recess 24 designated with 25 is here at right angles to the symmetry axis 20 of the opening 18. For the attachment and articulated support of the guide rail 12, the pull-out frame 1 is provided with bolts 26 which are fastened in the side walls 4 (FIGS. 2, 6 and 7). The bolts 26 have a collar 27, the diameter of which corresponds to the wider part 19 of the opening 18 (FIGS. 4, 6 and 7). Another bolt 30 which can be of the same design as the bolt 26 is further fastened to each side wall 4. The relative position of the bolts 26 and 30 is chosen so that the bolts 30 act as a stop and a horizontal position of the bottom surface 16 of the guide rail 12 is obtained.

The guide rails 12 and 12' are integral parts, according the presentation in FIGS. 3, 4 and 5. The guide rail 12' not shown separately differs from the guide rail 12 only by its mirror symmetrical design. For mounting on the pull-out frame 1, the guide rails are pushed with the wider part 19 of the openings 18 over the collar 27 of the bolts 26, and the guide rails come into engagement with the narrower part 23 of the openings 18 under the action of the force of gravity. A removal of the guide rails from the pull-out frame 1 is accordingly possible by lifting the guide rails against the action of the force of gravity and by subsequent lateral movement. If the guide rails starting from a vertical rest position, are swung forward in the direction of the horizontal, the recesses 24 come into engagement with the further bolts 30 where their collars 31 extend over the recess 24 according to the presentation in FIG. 7, and thereby additional security against motion transverse to the tilting direction is obtained. By the chosen right-angle relationship of the axes of symmetry of the openings 18 and the recesses 24 it is furthermore achieved that, in the folded-down position of the guide rail 12 according to FIG. 7, a shift of the guide rail 12 relative to the bolt 26 is impossible and thus there is no danger that the guide rail 12 could separate from the pull-out frame 1 unintentionally. The interaction of the recess 24 with the bolt is facilitated by the fact that the guide rail 12 has a rounded area adjacent to the recess 24.

Figure 10:
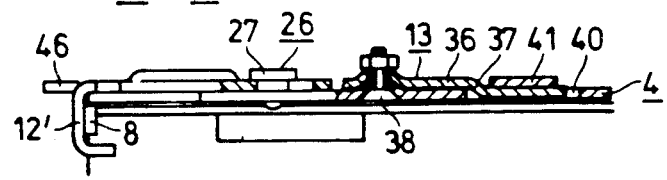
FIG. 10 shows a portion of the side wall of a pull-out frame in a cross section taken along line X—X of FIG. 1 with details of the latch in its mounted position.

In the following, details of the latch 13 will be explained, which is shown in FIG. 1 and is provided for maintaining the vertical rest position of the guide rails 12 and 12'. A latch is provided for each of the guide rails 12 and 12' on each side of the frame 1. According to FIGS. 8 and 9, the latch 13 is an integral sheet metal part comprising a two-armed lever which is provided with a bearing opening 35 for support on a screw 38 (FIG. 10). The shorter lever part 36 is provided with an offset 37 which corresponds approximately to the material thickness of the side walls 4, so that the latch 13 with the lever part 36 corresponding to FIG. 1, can be introduced through one of two parallel slot-shaped cutouts 40 of each side wall 4. Flush termination of the lever part 36 with the inside surface of each side wall 4 is accomplished by the provision that the part 41 of the side wall 4 located between the cutouts 40 is pushed through to the outside in the form of a bracket 41 as is shown particularly in FIG. 10. In a further cutout 42 of the side wall 4, a tension spring 43 is arranged by which a forward lever part 44 of the latch 13 is pretensioned in the direction of the arrow 45 in FIG. 1. This lever part is made in the form of a fork and has on the outside of the corresponding guide rail tab 46 as well as two shorter tabs 47 which are intended to rest against the inside of the corresponding guide rail. The distance between the tabs 46 and 47 required to extend beyond the guide rail is obtained by an offset in the area of the base of two cutouts 50 which separate the tabs 46 and 47 from each other. The central tab 46 is provided with a post or dimple 51 pushed out from the material of the latch 13, which is provided for engagement with an undercut recess 52 of the leg 14 of each guide rail and 12'. A recess 52 is located in an area 53 pushed out from the leg 13, the degree of deformation being chosen so that unimpeded interaction is obtained due to the alignment of the guide rail 12 and the latch 13 relative to the side wall 4. The same latches 13 can be used for the left and the right guide rail.

If the guide rails 12 and 12' are transferred from their horizontal operation position (FIG. 7) into the vertical rest position (FIGS. 1 and 6), the leg 14 arrives between the tabs 46 and 47. The post 51 thereby engages a starting inclined surface 54 in the vicinity of the recess 52, whereby the latch 13 is lifted against the direction of force of the tension spring 43 until the post 51 drops into the undercut of the recess 52. Due to the fork-like design of the forward lever part 44 of the latch 13, the guide rail and the corresponding latch align each other so that a disturbance of the interaction by a tolerance at this point is not expected. Accordingly, it is sufficient to make the post 51 at most in accordance with the material thickness of the leg 13. Such a post can be made, as already mentioned, by plastic deformation out of the material of the latch 13.

From the description above, it can be seen that the pull-out frame 1 needs to be provided as to its basic design only with the bolts 26 and 30 in the area of each side wall 4. The set of parts for equipping such a pull-out frame comprises two mirror-symmetrical guide rails 12 and 12' according to FIGS. 3, 4 and 5 as well as two identical latches 13 according to FIGS. 8 and 9 since these can be used on both sides. In addition to this and, for each of the latches, a screw is provided as the pivot and a tension spring is provided for pretensioning the latch in its locking position. These parts can be mounted to the pull-out frame 1 with a few manual operations.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Apparatus for receiving a draw-out switchgear including a frame and two guide rails for supporting the switchgear in a drawn-out position thereof, wherein the guide rails are pivotably fastened to the frame by cooperating connecting means disposed on the guide rails and the frame and stop means are provided limiting pivotable movement of each guide rail from a vertical resting position to a horizontal operating position whereby in the horizontal operating position the switchgear received by the apparatus can be moved into its drawn-out position, the connecting means being effective to fasten the guide rails under the influence of gravity to the frame and the connecting means being disengageable by lifting the guide rails in a direction opposite to the force of gravity, the connecting means comprising a cylindrical bolt provided with a collar, and a keyhole-like opening, the diameter of the bolt being designed to be closely received in a narrow part of the opening, and the diameter of the collar being designed so that said collar can pass through a wide part of the opening.

2. The apparatus recited in claim 1, wherein the stop means comprise a further bolt and a recess receiving the further bolt when the guide rails are moved into their operating position.

3. The apparatus recited in claim 2, wherein the bolts are arranged on the frame and the keyhole-like opening and the recess are arranged in the guide rails.

4. The apparatus recited in claim 2, wherein the keyhole-like opening has an axis of symmetry inclined relative to the vertical when the guide rails are in their vertical rest position and the recess is located on an extension of the axis of symmetry at the edge of the guide rails provided with the opening, the axis of symmetry of the recess being arranged at right angles to the axis of symmetry of the keyhole-like opening.

5. The apparatus recited in claim 2, wherein an edge of the guide rails having the recess cooperating with the further bolt has a rounded region as a connecting surface leading to the recess.

6. The apparatus recited in claim 4, wherein the axis of symmetry of the keyhole-like opening is arranged inclined by about 45° relative to the vertical in a direction of moving each guide rail from its rest position to its operating position.

7. The apparatus recited in claim 1, wherein each guide rail in its rest position can be locked by a latch which is pivoted about a bearing opening at a side wall of the frame, the frame being provided with a guidance opening for guiding the latch, the guidance opening being formed by one of two parallel cutouts in the side wall of the frame and the wall part located between the cutouts being pushed out of the plane of the side wall so as to form a bracket for the latch.

8. The apparatus recited in claim 7, further comprising a restoring spring for engaging the latch arranged in window-like opening of the side wall of the frame.

9. The apparatus recited in claim 7, wherein said latch comprises a lever part facing each cooperating guide rail, said lever part comprising a plurality of fork arms, one of the fork arms provided with a projection intended for engagement with a recess of a cooperating guide rail.

* * * * *